United States Patent [19]

Schaus et al.

[11] 4,440,405
[45] Apr. 3, 1984

[54] HYDRODYNAMIC SHAFT SEAL WITH CONTINUOUSLY DIVERGENT SEAL ELEMENT

[75] Inventors: Jerome E. Schaus, Glen Ellyn; Daniel Danek, Berywn, both of Ill.

[73] Assignee: Dana Corporation, Toledo, Ohio

[21] Appl. No.: 426,501

[22] Filed: Sep. 29, 1982

[51] Int. Cl.³ .............................................. F16J 15/32
[52] U.S. Cl. .................................. 277/134; 277/152; 277/166; 277/186
[58] Field of Search ......... 277/134, 152, 153, DIG. 8, 277/165, 166, 181, 183, 186

[56] References Cited

U.S. PATENT DOCUMENTS

| 2,272,650 | 2/1942 | Von Veh | 277/153 |
| 3,929,340 | 12/1975 | Peisker | 277/134 |
| 4,118,856 | 10/1978 | Bainard et al. | 277/134 X |

FOREIGN PATENT DOCUMENTS

| 729128 | 12/1942 | Fed. Rep. of Germany | 277/134 |
| 1076455 | 2/1960 | Fed. Rep. of Germany | 277/152 |
| 1294041 | 4/1962 | France | 277/134 |
| 215407 | 9/1967 | Sweden | 277/134 |
| 2066384 | 7/1981 | United Kingdom | 277/134 |

*Primary Examiner*—Robert S. Ward
*Attorney, Agent, or Firm*—F. B. McDonald

[57] ABSTRACT

A hydrodynamic shaft seal includes a sealing element defined by two radially extending faces, with concentric annular inner and outer edges forming the boundaries of the faces. The element includes a radially outwardly extending fixed body portion and a radially inwardly extending flexible body portion, a flexure ring defined by the boundary between the latter body portions. The faces of the element have a continuous divergence from the outer edge to the inner edge, the divergence falling within the range of 0.006 to 0.060 inch per inch of radial length of the flexible portion. The divergence results in an increasing lateral separation of the faces from the outer edge to the inner edge. In a preferred embodiment, the element has a wall thickness in the range of 0.025 to 0.050 inch, and the flexible body portion thereof has a radial length in the range of 0.200 to 0.600 inch.

9 Claims, 2 Drawing Figures

HYDRODYNAMIC SHAFT SEAL WITH CONTINUOUSLY DIVERGENT SEAL ELEMENT

BACKGROUND OF THE INVENTION

This invention relates to hydrodynamic sealing elements of the "washer" style for rotatable shafts, and more particularly to specific geometries or shapes of such elements for use in environments subject to high shaft runout or rotational eccentricity.

Numerous prior art hydrodynamic shaft sealing elements have been employed successfully under a variety of extreme temperatures, pressures, and other environmental conditions. However, in circumstances of severe shaft runout, there have of necessity been compromises in sealability. For example, inert and relatively dense materials such as plastics and polytetrafluoroethylenes have been desirable for assuring superior hydrodynamic sealing quality, durability and resistance to deterioration. In environments of severe shaft runout or eccentricity, however, the sealing elements have typically had to be limited to elastomeric materials for effective sealing due to greater resilience and flexibility of the latter. Thus, in spite of the shortcomings of elastomeric materials in the above-noted respects, they have been relied upon for their high runout followability in the latter environments.

Another aspect of sealing art, beyond the quality or optimal effectiveness of the sealing element per se, relates to achievement of a reasonable useful life of the seal. Of primary concern is the sealability effectiveness of the shaft contact portion of the sealing element. The washer style of sealing element generally has a contact portion about the shaft which defines a band, rather than a ring line as theoretically achieved by a lip style of sealing element. Also, the washer style of element inherently possesses a radially extending flexible body, which when positioned over a shaft for sealing, defines a beam cross-section normally deflected under load. The resulting bending forces are referred to as "beam" forces. Another set of interacting forces are imposed by the normally stretched annulus of mass surrounding the actual contact portion of the washer style seal. The latter are called "hoop" forces, and result from the radially inwardly directed "rubber-band" nature of the sealing lip contact with the shaft. A balance of beam and hoop forces has been difficult to achieve using conventional washer style sealing geometries, and has tended to result in less than a desirable effectiveness for a given sealing requirement. Ideally, sealability of the element would not have to be severely compromised when a relatively dense material, such as polytetrafluoroethylene, is utilized in environments subject to high shaft runout or eccentricity.

SUMMARY OF THE INVENTION

The invention disclosed herein provides an improved sealing member of the washer style for which both sealability and wear of contact portion are balanced for successful utilization under conditions of high shaft runout eccentricity. The sealing member may be made of one of a number of today's preferred denser, more inert materials, as for example plastics or polytetrafluoroethylenes, which possess inherently greater wear and deterioration resistance.

In a preferred form, the hydrodynamic shaft seal of the present invention includes a sealing element having two radially extending faces. Concentric annular inner and outer edges define the boundaries of the faces. The element includes a radially outwardly extending fixed body portion, and a radially inwardly extending flexible body portion, a flexure ring being defined by the interface between the aforesaid body portions. The faces have a continuous divergence or taper from the outer edge to the inner edge, the divergence being one which generally increases from the outer edge to the inner edge. In the preferred form, the lateral divergence of the faces falls within the range of from 0.006 to 0.060 inch per inch of radial length of the flexible body portion.

Also in the preferred form, the sealing element has a wall thickness in the range of 0.025 to 0.050 inch, and the flexible body portion has a radial length in the range of 0.200 to 0.600 inch. The flexure ring has a preferred diameter within the range of 0.200 to 0.600 inch greater than the diameter of a rotatable shaft disposed through the element.

DETAILED DESCRIPTION OF THE PREFERRED EMBODIMENT

Figure 1:
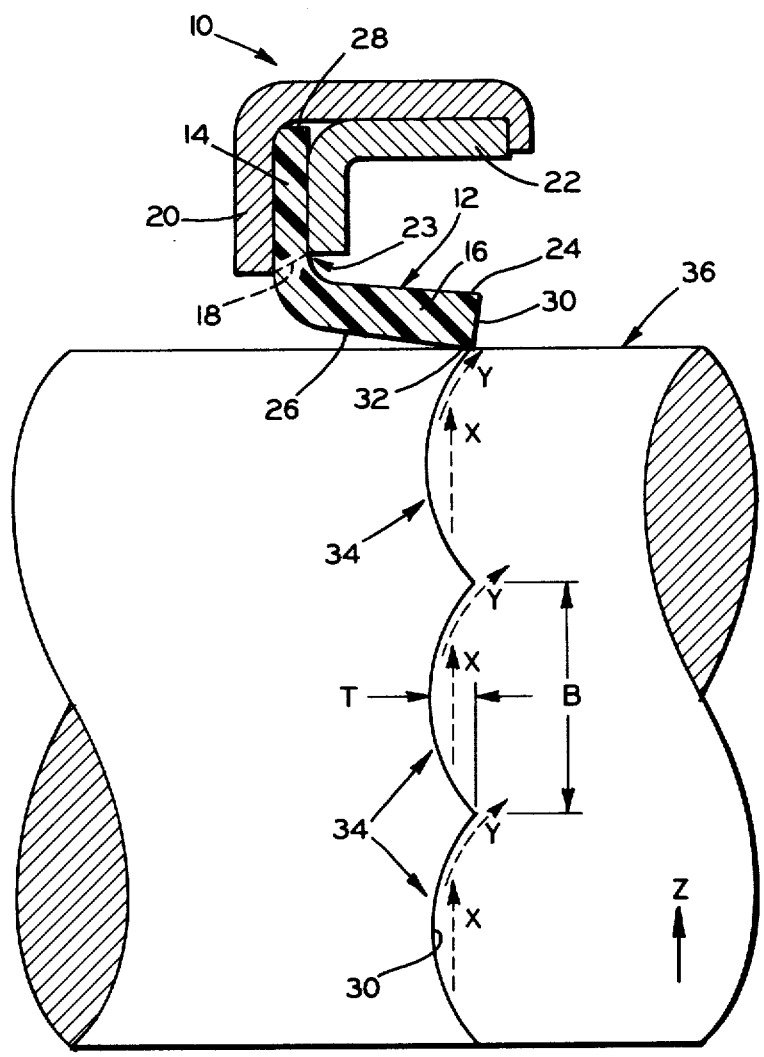
FIG. 1 is a side sectional view of a preferred hydrodynamic shaft seal of the present invention, shown positioned over a rotatable shaft.

A preferred embodiment of a hydrodynamic shaft seal of the present invention is shown at 10 in FIG. 1, wherein the seal functions as an oil seal for a rotating shaft 36. The shaft seal 10 includes a sealing element 12, which generally comprises a flat washer or annular disc shaped member. The element 12 has a constrained body portion 14 and a flexible body portion 16, a flexure annulus 18 being described by the interface between the latter portions. The annulus 18 is shown as a dotted line, and defines the outer boundary of the flexible portion 16 of the element 12. The body portion 14 is constrained by means of an external casing member 20 and an internal casing member 22, the latter members being arranged as shown. In the preferred embodiment, the rightwardly extending flexible body portion 16 includes a face 24 exposed to the oil side of the sealing environment, while the face 26 of the body portion 16 is exposed to the air side of the sealing environment. The sealing element 12 also defines outer and inner edges 28 and 30, respectively, and a shaft contact portion 32 makes contact with the relatively rotatable shaft 36. The shaft contact portion 32 is on the air side face 26 of the sealing element 12, and is bounded on one side by the inner edge 30.

It will be noted that in the preferred embodiment as shown, the inner edge 30 includes a series of undulations 34, which in the preferred embodiment may be described as scallops. The scallops 34 create an axially directed pumping action on oil positioned over the periphery of the shaft 36 during rotation of the shaft. Thus, for example, oil will lie circumferentially along the dotted arrow X until it makes contact with one of the scallops 34 of the inner edge 30, at which time it will be urged rightwardly along a path approximating the curved dotted arrow Y, assuming the shaft 36 is rotating in the direction Z relative to the sealing body portion 16. In this manner the scallops act continuously to move the oil axially inwardly toward the oil side of the seal.

Figure 2:
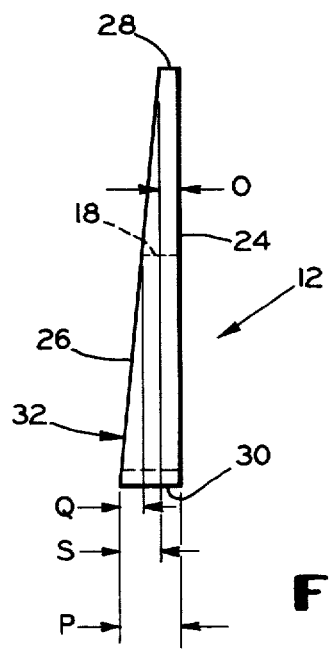
FIG. 2 is a cross sectional view of the sealing element of the hydrodynamic shaft seal of FIG. 1.

Referring now to FIG. 2, the sealing element 12 is shown in an unstressed state. It may be seen that the oil side face 24 and the air side face 26 of the sealing element 12 define an increasing lateral separation or taper from the outer edge 28 to the inner edge 30. Thus, in the preferred embodiment there is a continuous divergence of the faces 24 and 26 from the edge 28 to the edge 30, and although a constant divergence is shown, a non-constant divergence is also believed to be within the bounds of this invention. Also believed to be within the bounds of the present invention are tapers either biased toward the oil side face 24 or symmetrical to the radial axis of the element 12. The taper shown and described in the preferred embodiment, however, is biased toward the air side face 26.

The lateral separation of the faces 24 and 26 at the outer edge 28 describes the "wall thickness" at the outer edge, and is represented by the distance "O" as shown. Likewise, the "wall thickness" at the inner edge 30 is represented by the distance "P". The distance "S", which is the difference between "P" and "O", represents the amount of divergence or difference between the lateral separations at the outer edge 28 and at the inner edge 30. The average lateral separation between the faces 24 and 26 over the length of the sealing element 12 represents the "mean wall thickness", which is represented by a distance equal to "O" plus one-half of "S". The distance "Q" represents the difference between the lateral separation at the flexure annulus 18 and at the inner edge 30. It will be noted that the flexure annulus 18 will be distorted toward the shaft (See FIG. 1) as the air side face 26 of the sealing element 12 is flexed axially to accomodate the shaft. In the preferred embodiment, the preferred divergence of the faces 24 and 26 is in the range of 0.006 to 0.060 inch per inch of radial length of the flexible body portion 16 of the sealing element 12, as will be further explained hereinbelow.

It will be appreciated by those skilled in the art that the variables controlling sealability effectiveness are numerous. It will be further appreciated that one particular variable, the amount of runout or eccentricity of the associated rotating shaft, is quite difficult to predict and/or to design for in this respect. Those skilled in rotating shaft and/or sealing arts will appreciate that a low runout value falls in the range of from 0.001 to 0.005 inch as represented by total indicator reading on a dial indicator. Such a condition would be achieved for example in a crankshaft environment if the runout were measured fairly close to the crankshaft bearing. A medium or moderate runout value would fall within the range of 0.005 to 0.015 inch, while a high value of runout would fall above 0.015 inch. The latter condition (high runout) would be encountered in an unusual or extreme environment such as one in which a bearing was severely worn, or where the shaft being measured was unsupported. The seal of the present invention, however, is one wherein the geometry of the sealing element 12 is designed for the achievement of an effective seal under a severe runout condition as represented by a total indicator reading of up to 0.065 inch.

It will be appreciated by those skilled in the art that under severe runout or shaft eccentricity conditions, inertial forces can become great enough to cause cyclic separation of the sealing element 12 from the shaft 34. Hence, at high values of runout, it is paramount that the aforedescribed hoop and beam forces are carefully controlled to insure followability, and thus to maintain continuous contact between the sealing element 12 and the shaft 34.

The invention as herein described provides a novel means of achieving a successful distribution of mass in the sealing element 12. Thus, to the extent that a constant density material is utilized, the geometry of the flexible body portion 16 (the active portion of the sealing element) and the relative dimensions of the other seal and shaft parameters may be designed to achieve a balance between beam and hoop forces, which will overcome the inertial forces detrimental to effective sealing at high runout values. For this purpose, the present invention defines a continuous increase in the lateral separation of the faces 24 and 26 from the inner edge 30 to the flexure annulus 18.

EXAMPLE

The following embodiment of a hydrodynamic shaft seal 10 was constructed for a six inch diameter shaft, and found to possess all requisite attributes of effective sealing under extreme runout conditions at a shaft rotational speed of 2400 revolutions per minute. The mean wall thickness, "O" plus one-half "S", was in the range of 0.025 to 0.050 inch. The distance Q was 0.004 to 0.012 inch over the flexible body portion 16, which had a radial dimension, as measured from the flexure annulus 18 to the inner edge 30, of 0.200 to 0.600 inch. As such, the divergence of the faces 24 and 26 from the flexure annulus 18 to the inner edge 30 fell within the range of 0.006 to 0.060 inch per inch of radial length of the flexible body portion 16. Also, the interference of the flexible body portion 16 with the shaft 36 was such that the mean internal diameter of the inner edge 30 was 0.200 to 0.600 inch smaller than the six inch diameter of the shaft 36. Moreover, the position of the flexure annulus 18 relative to the shaft is a function of the position of the inside corner 23 of the internal casing member 22 relative to the shaft 36. In the preferred embodiment, the internal diameter of the latter inside corner of the casing member 22 is 0.200 to 0.600 inch greater than the diameter of the shaft 36.

The axial variation of the scallops or undulations 34 as measured by "T" (FIG. 1) was in the range of 0.010 to 0.060 inch, and the number of undulations was preferably in the range of two to eight. It is also preferred that the material of the sealing element 12 is a form of polytetrafuoroethylene.

The following comprises the parameters for a specific successful washer seal system, all within the above-noted ranges:

(a) Shaft 36 = 6 inch diameter
(b) "Q" = 0.007 inch;
(c) "O" plus ½ "S" = 0.0425 inch;
(d) Internal diameter of corner 23 = 0.360 inch greater than diameter of shaft 36;
(e) Mean diameter of inner edge 30 = 0.420 inch smaller than diameter of shaft 36;
(f) "T" = 0.030 inch; and
(g) Number of undulations 34 = 8.

It is to be noted that the parameters as herein defined of the hydrodynamic teflon shaft seal 10 represent a compromise between longevity of the sealing element 12 and sealability of the resulting seal system in an environment wherein an extreme shaft runout is experienced. Test results verified that the greater the ratio of the lateral separation of the faces at the inner edge 30 to the lateral separation at the flexure annulus 18, the greater the wearability and insensitivity to heat of the contact portion 32 of the flexible sealing body portion 16. On the other hand, it was also determined that the greater the lateral separation ratio became, commercially acceptable sealability was maintained, up to a value of Q equal to 0.012 inch, all other parameters being held constant.

Thus, as the length of the flexible body portion 16 is within the preferred range of 0.200 to 0.600 inch, it will be seen that the lateral separation of the faces 24 and 26 falls within the range of 0.006 to 0.060 inch per inch of radial length of the flexible body portion 16. A superior seal is thus achieved, which is capable of withstanding a runout or rotational eccentricity of up to 0.065 inch.

In conclusion, the present invention provides a hydrodynamic shaft seal which, at the operating parameters herein noted, will avoid leakage of oil under conditions of extreme shaft runout eccentricity. Although increasing divergence of the oil and air faces of the seal tended to negatively influence sealability, the parameters of sealing element longevity including shaft temperature at the seal-shaft interface (tested under dry conditions to simulate the worse possible circumstances), were favorably influenced as the amount of taper increased. Thus, a positive amount of taper is desirable, while an excessive taper will result in an unacceptable sealability under high runout conditions. The latter phenomenon may be due in part to the change in hoop to beam force ratios associated with a resultant increased mass at the sealing contact portion of the sealing element relative to the decreased mass at the flexure ring 18. The overall preferred range of "Q", the lateral separation from the flexure ring 18 to the inner edge 30 (0.004 to 0.012 inch), was based on a combination of shaft interface temperature, contact poriton wear width (these indicate seal longevity), and sealability effectiveness at 0.065 inch total runout.

What is claimed is:

1. In a hydrodynamic shaft seal including a sealing element comprising two radially extending faces, generally concentric annular inner and outer edges defining the boundaries of said faces, said element further comprising a radially outwardly extending fixed body portion, and a radially inwardly extending flexible body portion; an improvement comprising said faces having a continuous divergence from said outer edge to said inner edge, said divergence comprising an increasing lateral separation of said faces from said outer edge to said inner edge in the range of 0.006 to 0.060 inch per inch of radial length of said flexible body portion.

2. The hydrodynamic shaft seal of claim 1 wherein said sealing element is adapted for sealing contact with a relatively rotatable shaft, said element having a mean wall thickness in the range of 0.025 to 0.050 inch, and wherein said flexible body portion of said sealing element has a radial length in the range of 0.200 to 0.600 inch.

3. The hydrodynamic shaft seal of claim 2 wherein said flexible body portion further comprises an annular shaft contact portion along one of said radially extending faces, which when said sealing element is installed over a relatively rotatable shaft extends axially along the rotatable shaft disposed therethrough, wherein said annular inner edge is generally perpendicular relative to said shaft, and said contact portion is bounded by said inner edge.

4. The hydrodynamic shaft seal of claim 3 further comprising a flexure ring defined by the interface between said fixed and flexible body portions of said sealing element, said flexure ring having a diameter which is 0.200 to 0.600 inch greater than the diameter of a relatively rotatable shaft disposed therethrough.

5. The hydrodynamic shaft seal of claim 4 wherein in an unstressed condition said radially inner edge of said sealing element has a mean diameter of 0.200 to 0.600 inch less than the diameter of a relatively rotatable shaft disposed therethrough.

6. The hydrodynamic shaft seal of claim 5 wherein said radially inner edge defines a plurality of cyclical undulations over said shaft contact portion of said sealing element.

7. The hydrodynamic shaft seal of claim 6 wherein the extremities of said undulations fall within a total variation range of 0.010 to 0.060 inch.

8. The hydrodynamic shaft seal of claim 7 wherein said plurality of cyclical undulations comprises a number in the range of two to eight.

9. The hydrodynamic shaft seal of claim 8 wherein said sealing element is of a polytetrafluoroethylene material.

* * * * *